No. 817,667. PATENTED APR. 10, 1906.
T. H. PRICE & W. P. QUENTELL.
COTTON HARVESTER.
APPLICATION FILED JAN. 13, 1905.
2 SHEETS—SHEET 1.
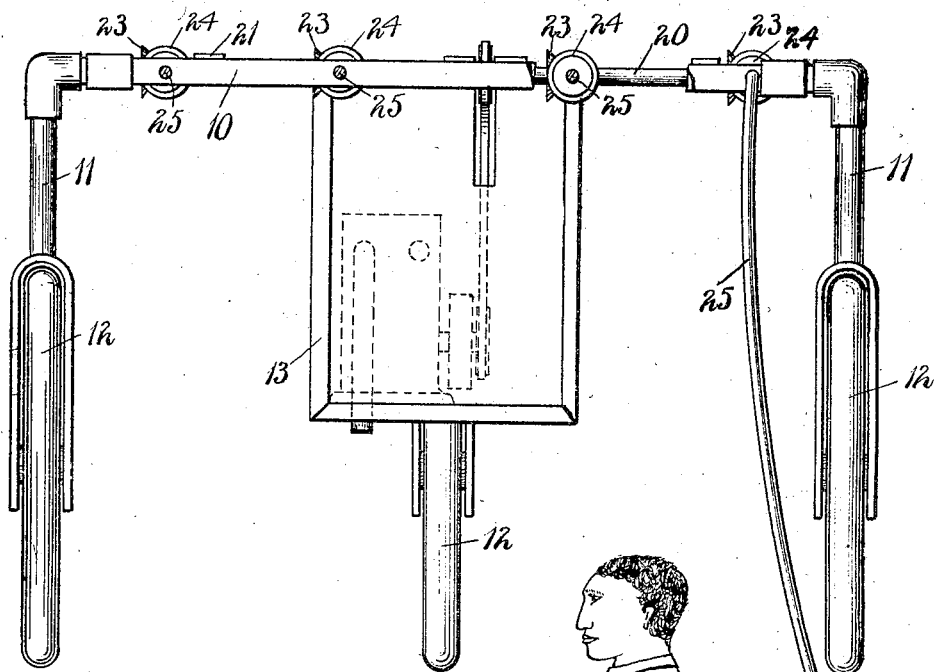
FIG. 1.
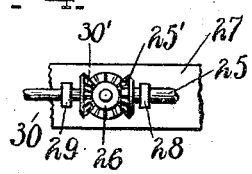
FIG. 4.
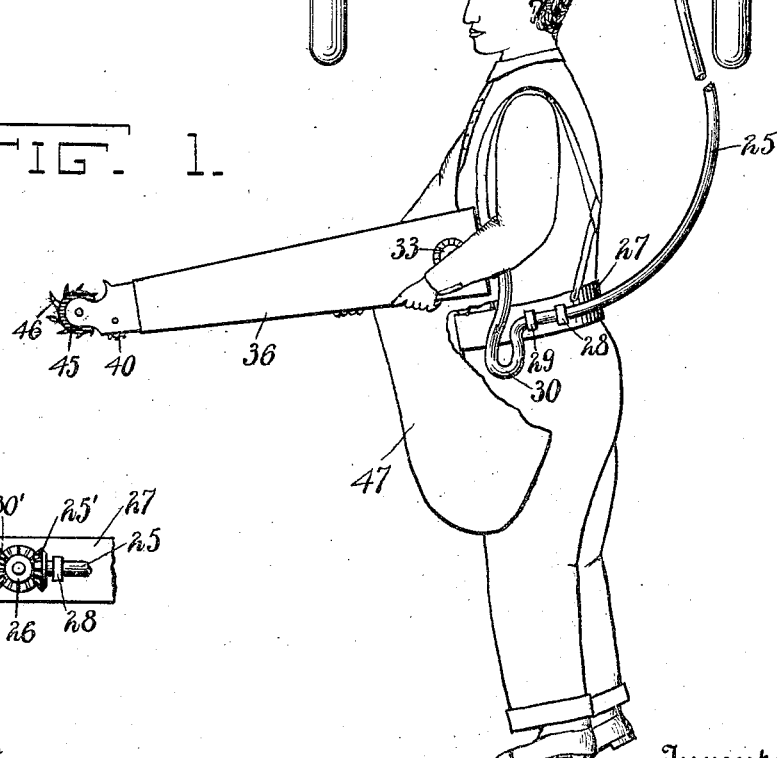
Witnesses
Inventors
Theodore H. Price & Wm. P. Quentell
By their Attorneys No. 817,667. PATENTED APR. 10, 1906.
T. H. PRICE & W. P. QUENTELL.
COTTON HARVESTER.
APPLICATION FILED JAN. 13, 1905.
2 SHEETS—SHEET 2.
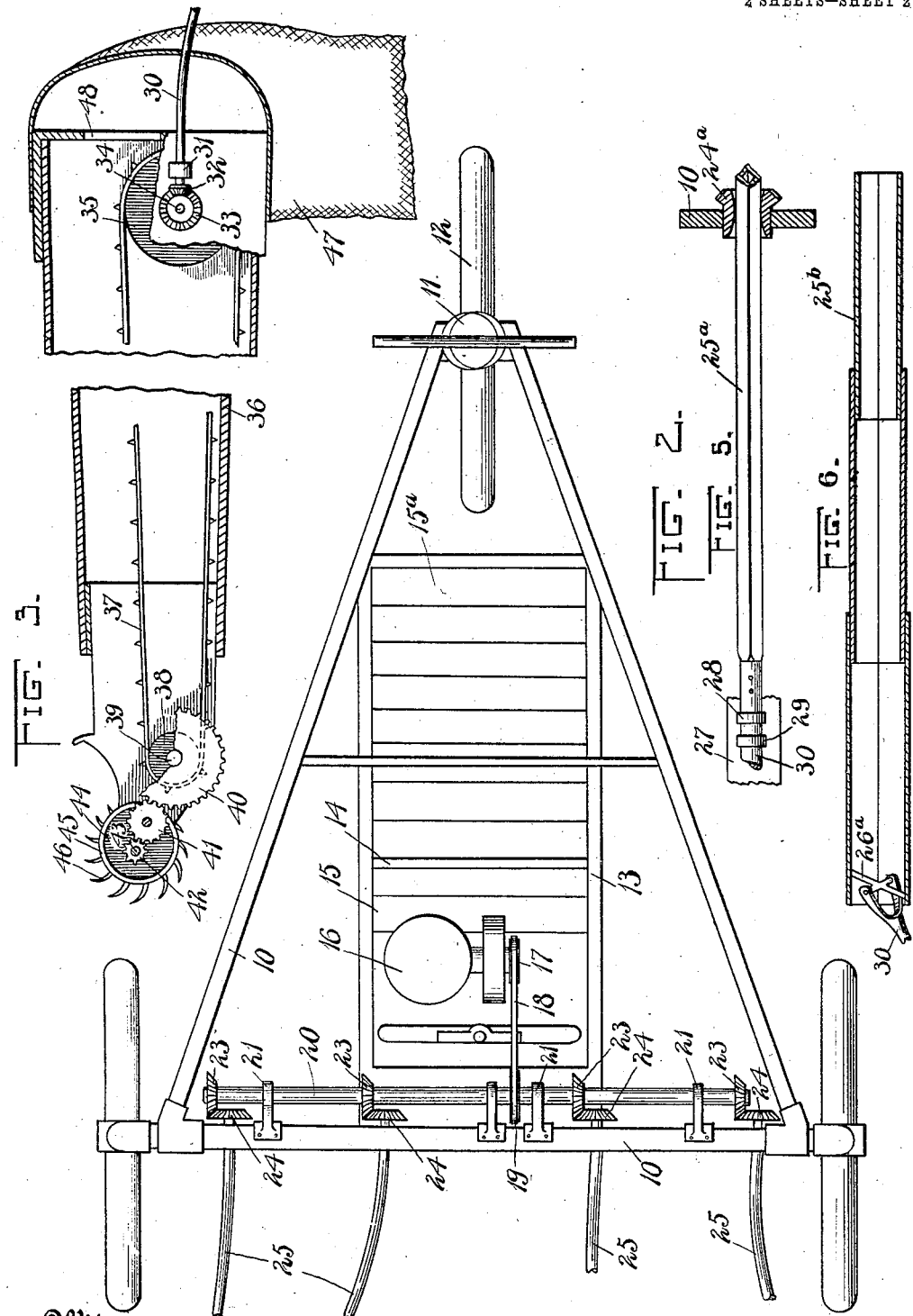

UNITED STATES PATENT OFFICE.

THEODORE H. PRICE AND WILLIAM P. QUENTELL, OF NEW YORK, N. Y., ASSIGNORS TO UTILITY COTTON PICKER COMPANY, OF NEW YORK, N. Y., A CORPORATION OF NEW YORK.

COTTON-HARVESTER.

No. 817,667.

Specification of Letters Patent.

Patented April 10, 1906.

Application filed January 13, 1905. Serial No. 240,890.

*To all whom it may concern:*

Be it known that we, THEODORE H. PRICE and WILLIAM P. QUENTELL, citizens of the United States of America, residing in the borough of Manhattan, in the city, county, and State of New York, have invented certain new and useful Improvements in Cotton-Harvesters, of which the following is a specification.

As is well known, cotton is still almost entirely harvested by hand, the various mechanisms devised for the purpose having failed of adoption to any considerable extent. In the main these mechanisms have been of two classes—first, the machine mounted usually on wheels, drawn or propelled through the field and carrying picking instruments intended to be carried through or projected from time to time into the growing cotton, and, second, the hand-operated picker carried by the operator. The machines of the first class have the disadvantage of lacking adaptation to the varying conditions of cotton and position of plant, resulting in imperfections of operation. which have been so frequently pointed out as not to require repetition here, and when effort has been made in such machines to render the individual picking instruments separately controllable the result has been great cumbersomeness of vehicle and complexity of mechanism without sufficient compensating gain of scope of action for the picking members. On the other hand, the hand carried and operated picker, while solving the problem of individual selection of the cotton, has lacked power and speed.

We have had in view the devising of a cotton-harvesting machine which will have the power and speed of the first class of machines above referred to and the capacity for individual selection of the cotton belonging to the second class, and in carrying out this purpose we have designed a form of harvester in which the picker-driving power is carried by a movable vehicle on which is preferably mounted also a receiver for the picked cotton, while the picking instruments themselves, while receiving their picking motion from the said mechanical power, are carried individually by operators distributed in the field adjacent to the machine and acting, therefore, as intermediary supports upon the ground for the power-transmitting devices located between the source of power on the vehicle and the hand carried and directed picking instrument.

We have found that the best results are obtained with cotton-picking implements which are adapted to be completely directed by the operator, are capable of having their picking members applied successively to the individual cotton-bolls, and are mechanically driven both as to their picking member and the member which conveys the picked cotton away from the picking member to the storage-receptacle, and in carrying out our present invention we combine with such a cotton-picking implement a suitable vehicle conveying a source of power which has operatively connected to it a plurality of power-conveying members leading to the individual picking implements. In the form of our invention shown herein these power-conveying members are supported intermediate of the picking implement and the vehicle upon the person of the operator Our invention will be more readily understood by reference to the drawings forming a part of this specification, in which,—

Figure 1 is a schematic elevation of the entire system. Fig. 2 is a plan view of the vehicle carrying the source of power, and Fig. 3 is a side elevation of a cotton-picking means with the casing-wall removed to show the interior construction. Fig. 4 is a detail view of a modified form of the mechanism for connecting the two parts of the flexible power-conveying means at the operator's belt. Figs. 5 and 6 are detail views illustrating modified forms of power-conveying means.

Referring now more specifically to Figs. 1 and 2 of said drawings, 10 designates the triangular framework of the vehicle, said framework 10 being provided with downwardly-extending forked members 11, in which are journaled the vehicle-wheels 12. The said framework also supports a centrally-positioned body portion 13, partitioned by wall 14, the forward compartment 15 thus partitioned off being designed to carry the source of power, which may be of any suitable type, preferably a hydrocarbon-engine 16. The rear compartment 15ª may be used as a common receiver for the cotton which is picked by the operators. The engine 16 is provided with a driving-pulley 17, over which a belt 18 travels, and said belt 18 drives a wheel 19, which is suitably secured to the shaft 20, journaled in the brackets 21, said shaft 20 being provided at suitable intervals with bevel gear-wheels 23, which are in mesh with corresponding bevel gear-wheels 24, suitably journaled in the forward member of the vehicle-frame. It will thus be seen that as the engine 16 is operated the shaft 20 is rotated, and thus rotation is imparted to the bevel gear-wheels 23 and 24, the bevel gear-wheels 24 having suitably connected to their axles means for conveying power to the picking members—for example, as shown in Figs. 1 and 2 the flexible shafts 25. The other ends of said flexible shafts 25 may, as shown in Fig. 1, be connected by suitable detachable coupling to a short flexible shafting 30, one end of which has bearing in brackets 28 29, fastened to a belt 27 to be worn by an operator, or the members 25 30 may be parts of a continuous shaft, having bearing in the brackets 28 29, in which event the apparatus would preferably be attached to and detached from the operator by placing or removing the belt, or, as shown in Fig. 4, the shaft 25 may terminate in a bevel-gear 25', meshing with an idle bevel-gear 26, journaled on a stud on the belt 27 and meshing in turn with a bevel-gear 30' on the end of shaft 30. Some such detachment of the two shafts or shaft portions 25 30 is preferred, as it enables the using of a lighter and more flexible shaft for the portion 30, as indicated in Fig. 4, as is desirable for obvious reasons.

A suitable form of hand-directed cotton-picking instrument to coöperate with the mechanism just described is illustrated in Figs. 1 and 3. The shorter flexible shaft 30 has its outer end journaled in a bracket 31 on the cotton-picker and is provided with a bevel gear-wheel 32. Said gear-wheel 32 is in mesh with a bevel gear-wheel 33, which is secured on the shaft 34 of a driving-pulley 35. The driving-pulley 35 is positioned in the rear portion of the casing or frame 36 of the cotton-picker and drives a conveying-belt 37, which has its forward end supported upon a pulley 38, which is suitably secured on a shaft 39, suitably journaled in the framework of the cotton-picker. The shaft 39 also carries a gear-wheel 40, the teeth of which mesh with an idle pinion 41, said idle pinion 41 driving a gear-wheel 42, suitably secured on the shaft 43 of a cotton-picking member 44. The cotton-picking member 44 comprises a cylinder 45, through which are projected into which are retracted the picking-fingers 46. The projection and retraction of these fingers may be accomplished in any preferred way, one such way being described in our Patent No. 796,245, dated August 1, 1905.

At the rear end of the casing we support a cotton-receptacle 47, into which the cotton is delivered through the opening 48 in the rear end of the casing and from which the operator may from time to time remove it to the receptacle 15ª on the vehicle.

In the operation of our machine the vehicle is propelled or moved in any suitable manner. The engine being started, the flexible shafts 25 impart motion to the several individual cotton-pickers through the mechanism described. The operators walk along the rows of cotton and present the picking end of the picker to the cotton. Thereupon the cotton-picking member picks the cotton and carrying it into the casing discharges it upon the forward end of the conveying-belt 37. The conveyer-belt then carries the cotton rearwardly in the casing and discharges it through the above-mentioned opening 48 into the receptacle 47.

While we have shown and described a specific embodiment of our invention, we do not wish to limit ourselves to the exact terms and construction herein set forth.

The use of the operator as an intermediate support for the power-conveying mechanism between the motive power and the picking instrument proper is important when, as in this invention, the picker is supported and directed by the operator himself, enabling him to manipulate the picker independently without being disturbed by having to give attention to the main power-conveying shaft, steadying the action and enabling the use of different characters of transmitting mechanisms for the two parts—as, for example, a relatively more flexible shaft for the part 30 than for part 25.

There may be substituted for the flexible power-conveying shafts the hollow steel rod 25ª, Fig. 5, coupled at the belt 27 to the flexible shaft 30 and having sliding bearing at its other end in the pinion 24ª, carried in the vehicle-frame and driven from the motor, as are the pinions 24 in the form of construction shown in Figs. 1 and 2. The rod 25ª and its bearing in pinion 24ª engage in any preferred way to insure the turning of the rod by the pinion, while permitting of relative axial movement—as, for example, by making both rod and bearing square. The bearing is also preferably slightly flared outwardly at each end to allow some lateral play to the rod without binding in the bearing, or, as shown in Fig. 6, a telescopic rod 25ᵇ may be used in place of the rod 25ª, the several members being guided on each other, as by being made square in cross-section, in some manner to insure corotation while permitting such relative longitudinal movement as is required to permit the operator to vary his distance from the vehicle, while the necessary lateral play is provided for by connecting the rod at its ends to the shaft 30 and pinion 24 by gimbal or similar joints 26ª.

Having thus described our invention, the following is what we claim as new therein and desire to secure by Letters Patent:

1. A cotton-harvester comprising a mechanical picking instrument having a conveying-belt, a flexible driving-shaft connected with the conveying-belt, a shaft-bearing for supporting the flexible driving-shaft and means for supporting the bearing upon the operator independently of the casing.

2. In a cotton-harvester, the combination with a movable source of power, and a cotton-picker carried by the operator and comprising a tubular casing, a rotary cotton-picking member and the cotton-conveying belt operating within and longitudinally of said casing; of power-conveying means operatively connecting the movable source of power with the said picking member and cotton-conveying belt.

3. In a cotton-harvester, the combination of a vehicle adapted to be moved from place to place, a motor for the picking instrument carried thereby, a picking instrument carried by the operator and having mechanical driving mechanism, a flexible power-shaft operatively connecting the motor with the said mechanical driving mechanism of the picking instrument, a shaft-bearing for supporting the flexible power-shaft, means for supporting the shaft-bearing upon the operator intermediate of the motor and picking instrument and separate from and independent of the latter.

4. In a cotton-harvester, the combination of a motor, a movable vehicle, a picking instrument carried by the operator and having a flexible driving device, a shaft-bearing for supporting said flexible driving device, means for supporting the shaft-bearing upon the operator intermediate of the picking instrument and motor and separate from and independent of the picking instrument, and a flexible power-shaft connecting said driving device to the vehicle and capable of yielding both longitudinally and laterally.

5. In a cotton-harvester, the combination with a movable source of power, a flexible shaft leading therefrom, a belt carried by the operator, and means for journaling the end of said flexible shaft on said belt; of a cotton-picker, a flexible shaft leading from said cotton-picker and adapted to operate the same by its rotation, means for journaling the end of the last-mentioned flexible shaft on said belt, and means on said belt for imparting the rotation of the first-mentioned flexible shaft to the other flexible shaft.

6. In a cotton-harvester, the combination with a vehicle, a source of power carried thereby, and a plurality of flexible driving-shafts operated by said source of power; of a plurality of cotton-pickers carried by the operators, belts having shaft-bearings and adapted to be worn by the operators and on which are journaled the ends of said flexible shafts, and means suitably connected with said ends for imparting the operating power to said cotton-pickers.

7. In a cotton-harvester, the combination with a vehicle, a suitable source of power carried thereby, a shaft driven by said source of power, and a plurality of flexible shafts to which rotation is imparted by said first-mentioned shaft; of a plurality of cotton-pickers carried by the operators, belts worn by the operators on which the ends of said flexible shafts are suitably journaled flexible shafts suitably journaled in and leading from said belts to said cotton-pickers, and power-transmission means suitably interposed between the respective ends of the first-mentioned flexible shaft and the second-mentioned shaft.

8. In a cotton-harvester, the combination with a vehicle, a source of power carried thereby, a single shaft driven by said source of power, a plurality of bevel gear-wheels mounted on said shaft, a plurality of bevel gear-wheels meshing with the same and suitably secured to flexible power-conveying shafts; of a plurality of cotton-pickers carried by the operators, belts worn by said operators and provided with journal-bearings for the ends of said flexible shafts, bevel gear-wheels on the ends of said flexible shafts, idle bevel-gears driven by the same, power-conveying flexible shafts leading from said cotton-pickers and suitably journaled in brackets on said belts, and bevel-gears on the ends of the same in mesh with said idle bevel-gears.

9. In a cotton-harvester, the combination of a motor, a movable vehicle, a picking instrument carried by the operator, a flexible power-conveying device supported at one end on said vehicle having operative connection with said motor and supported at its other end on the operator, and a more flexible power-conveying device operatively connecting the first-named power-conveying device with the picking instrument

THEODORE H. PRICE.
WILLIAM P. QUENTELL.

Witnesses:
R. R. COATS,
C. S. MAWR.